(12) United States Patent
Obata

(10) Patent No.: US 8,579,449 B2
(45) Date of Patent: Nov. 12, 2013

(54) POINTER TYPE MEASURING INSTRUMENT

(75) Inventor: Masato Obata, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 88 days.

(21) Appl. No.: 13/061,237

(22) PCT Filed: Aug. 20, 2009

(86) PCT No.: PCT/JP2009/064544
§ 371 (c)(1),
(2), (4) Date: Feb. 28, 2011

(87) PCT Pub. No.: WO2010/024169
PCT Pub. Date: Mar. 4, 2010

(65) Prior Publication Data
US 2011/0164396 A1   Jul. 7, 2011

(30) Foreign Application Priority Data
Aug. 28, 2008   (JP) ................. 2008-219980

(51) Int. Cl.
*G01D 13/22* (2006.01)
*B60Q 3/04* (2006.01)
(52) U.S. Cl.
USPC .............. 362/23.21; 362/23.14; 362/489; 362/511; 116/48
(58) Field of Classification Search
USPC ............ 362/26, 489, 511; 116/48, 288
See application file for complete search history.

(56) References Cited

U.S. PATENT DOCUMENTS

| 5,372,087 | A | * | 12/1994 | Kato et al. ................ 116/288 |
| 5,839,809 | A | * | 11/1998 | Ishimaru et al. ............ 362/23 |
| 6,820,991 | B2 | * | 11/2004 | Wakaki et al. .............. 362/27 |
| 7,624,699 | B2 | * | 12/2009 | Harada et al. ............. 116/286 |
| 7,629,874 | B2 | * | 12/2009 | Araki et al. .............. 340/425.5 |
| 7,743,726 | B2 | * | 6/2010 | Yoshida .................. 116/287 |
| 7,876,235 | B2 | * | 1/2011 | Fournier et al. ......... 340/815.45 |
| 2007/0273647 | A1 | | 11/2007 | Fournier |

FOREIGN PATENT DOCUMENTS

| JP | 2004-309397 | 11/2004 |
| JP | 2006-71283 | 3/2006 |
| JP | 2007-121112 | 5/2007 |
| WO | WO 2006/005821 A1 | 1/2006 |

* cited by examiner

*Primary Examiner* — Peggy A. Neils
(74) *Attorney, Agent, or Firm* — McDermott Will & Emery LLP

(57) ABSTRACT

Disclosed is a pointer type measuring instrument of a novel look, in which an indication portion detours the outer circumference of a display portion and can be visually confirmed as if the indication portion is floating above the display portion. The pointer type measuring instrument (M) comprises a display means (1), a drive body (2) mounted on the back side of the display means (1), an arm portion (3) mounted on the output shaft (26) of the drive body (2) and detouring the outer circumference of the display means (1), an indicating portion (5) extending from the arm portion (3) toward the center of the display means (1) and indicating an indicator portion (4) disposed on the display means (1), and a first light source (7) mounted on the arm portion (3) or the indicating portion (5) and causing the indicating portion (5) to glow.

8 Claims, 2 Drawing Sheets

POINTER TYPE MEASURING INSTRUMENT

RELATED APPLICATIONS

This application is the U.S. National Phase under 35 U.S.C. §371 of International Application No. PCT/JP2009/0654544, filed on Aug. 20, 2009, which in turn claims the benefit of Japanese Application No. 2008-219980, filed on Aug. 28, 2008, the disclosures of which Applications are incorporated by reference herein.

TECHNICAL FIELD

The present invention relates to a pointer type measuring instrument including an indicating portion turned in front of a display portion such as a dial and a liquid crystal display.

BACKGROUND ART

A conventional pointer type measuring instrument includes a dial, a drive body placed on the back-face side of the dial, a pointer body including an arm portion mounted on an output shaft of the drive body and detouring around the dial and an indicating portion provided for the arm portion, a light source placed on the pointer body and causing the indicating portion to emit light, a circuit board placed on the back-face side of the display means and including the drive body, and a flexible substrate having one end connected to the light source and the other end connected to the circuit board to pass electric current to the light source.

The pointer type measuring instrument includes a colored layer on the back side of the indicating portion and the indicating portion is illuminated by light from the light source.

PRIOR ART DOCUMENT

Patent Document

Patent Document 1: International Publication WO 2006/5821 brochure

DISCLOSURE OF THE INVENTION

Problems that the Invention is to Solve

In the indicating portion, however, the whole indicating portion located on the front face of the dial emits light. Therefore, the indicating portion looks as if it extended from the outer peripheral side of the dial in the pointer type measuring instrument in which the indicating portion detours from the outer peripheral side of the display such as the dial, thereby presenting the problem in which the indicating portion does not look as if it floated on the plate face of the dial.

The invention has focused attention on the abovementioned problem and it is an object thereof to provide a pointer type measuring instrument in which an indicating portion detours from the outer peripheral side of a display portion and can be visually recognized as if it floated on the display portion to achieve a new look.

Means for Solving the Problems

The invention provides a pointer type measuring instrument including a display portion, a drive body provided on the back-face side of the display portion, an arm portion mounted on an output shaft of the drive body and detouring around the outer periphery of the display portion, an indicating portion extending from the arm portion toward the center of the display portion and pointing to an indicator portion provided for the display portion, and a light source mounted on the arm portion or the indicating portion and illuminating the indicating portion, wherein the indicating portion includes a light-guide portion guiding light emitted by the light source and a light-transmitting member, the light-guide portion is provided with a mirror-face portion and a light-reflecting portion, the light-transmitting member is provided on the side of the light-guide portion opposite to the side on which the light-reflecting portion is provided and in the portion coincident with the light-reflecting portion of the light-guide portion, and the light-transmitting member is provided with a diffusing portion which diffuses light from the light-guide portion.

In the invention, the diffusing portion is provided on the face of the light-transmitting member opposite to the light-guide portion and on a light-exit face of the light-transmitting member.

In the invention, the light-reflecting portion is formed of a plurality of groove portions formed in a direction perpendicular to the longitudinal direction of the light-guide portion.

In the invention, the groove portions are formed to have smaller intervals between them with distance from the light source.

In the invention, the light-transmitting member is formed in a milky color.

In the invention, the light-transmitting member is colored according to a color tone of the light source.

In the invention, a shield member is provided to cover the side faces of the light-guide portion and the light-transmitting member.

In the invention, an anti-reflection portion is provided on the side of the light-guide portion opposite to the side on which the mirror-face portion is provided and on the surface coincident with the mirror-face portion.

Advantage of the Invention

According to the invention, the intended object, and in the pointer type measuring instrument in which the indicating portion detours from the outer peripheral side of the display portion, the indicating portion can be visually recognized as if it floated on the display portion, thereby providing the pointer type measuring instrument with a new look.

BEST MODE FOR CARRYING OUT THE INVENTION

Figure 1:
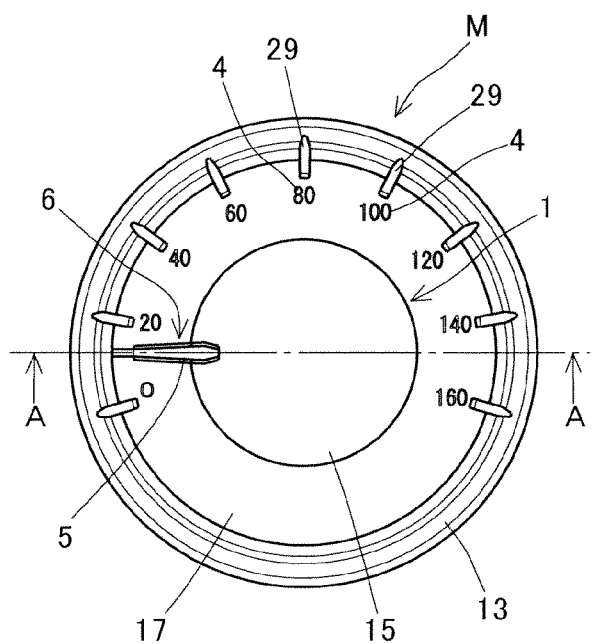
[FIG. 1] A front view showing a pointer type measuring instrument according to Embodiment 1 of the invention.

Embodiment 1 of the invention will hereinafter be described with the accompanying drawings.

A pointer type measuring instrument M of the present embodiment displays the speed of a vehicle and includes display means 1 serving as a display portion, a drive body 2, a pointer body 6 including an arm portion 3 and an indicating portion 5, a first light source 7 provided for the pointer body 6 and causing the indicating portion 5 to emit light, a circuit board 8, a second light source 9 mounted on the circuit board 8, and a flexible substrate 10 electrically connecting the first light source 7 to the circuit board 8.

Reference number 12 shows a housing; 13 a bend member; and 14 a frame.

The display means 1 is formed of a display 15, an accommodating case 16 accommodating the display 15, and a front-face cover 17 covering an opening 16a of the accommodating case 16. The display means 1 is fixed to the circuit board 8 with means as appropriate.

The display 15 displays information about vehicle and the like. The information about vehicle includes navigation, alarm display about vehicle, outside air temperature of vehicle and the like.

The display 15 employs a dot-matrix liquid crystal display element 18 for displaying the above-mentioned information. Reference numeral 19 shows a light source for liquid crystal which illuminates the liquid crystal display element 18; 20 an optical member which gathers or diffuses light from the light source 19; 21 a case which accommodates the liquid crystal display element 18, the light source 19, and the optical member 20; and 22 a cover which covers the case 21. The cover 22 is provided with a window 23 which exposes the liquid crystal display element 18. A pole 24 is provided for the case 21 and is used to fix the display 15 to the accommodating case 16.

The accommodating case 16 is made of light-shielding synthetic resin and has a cup shape. The accommodating case 16 has an opening 25 formed therein which allows light to enter from the second light source 9. A plurality of openings 25 are provided.

The front-face cover 17 is made of transparent synthetic resin and allows visual recognition of the display 15 and the interior of the accommodating case 16. The front-face cover 17 serves as a dial and includes an indicator portion 4 consisting of numerals representing speeds. The indicator portion 4 is formed on the back face of the front-face cover (the lower-side face in FIG. 2) by fine projections and depressions. A wall portion 27 formed to hang in the direction of the drive body 2 is provided around the plate face of the front-face cover 17. The wall portion 27 serves to fix the front-face cover 17 to the accommodating case 16 and also serves to let in the light from the second light source 9. The indicator portion 4 provided for the front-face cover 17 is illuminated by light taken into the accommodating case 16 through the openings 25 and light taken through the wall portion 27 of the front-face cover 17.

The drive body 2 is an electric motor such as a cross-coil measuring instrument body and a stepping motor, includes a rotatory output shaft 26, and rotates the pointer body 6.

The pointer body 6 is formed of the arm portion 3 and the indicating portion 5.

The arm portion 3 is made of synthetic resin, has an L shape which detours around the outer periphery of the display means 1, and has one end which holds the indicating portion 5 and the other end attached to the output shaft 26 of the drive body 2.

The indicating portion 5 is fixed to the arm portion 3 and extends from the arm portion 3 toward the center of the display means 1. The indicating portion 5 indicates the numerals of the indicator portion 4 or a scale, described later, not with the end portion closer to the center of the display means 1 but near the portion fixed to the arm portion 3.

The indicating portion 5 is formed of a light-guide portion 51, a light-transmitting member 52, and a light-shielding member 53.

The light-guide portion 51 is made of light-transmittable synthetic resin and guides light emitted from the first light source 7. A mirror-face portion 54 and a light-reflecting portion 55 are provided from the side of the arm portion 3 on a lower face of the light-guide portion 51 (the lower-side face in FIG. 2).

The mirror-face portion 54 is a flat face and prevents reflection of light from the first light source 7 toward the upper face side.

The light-reflecting portion 55 is formed of a plurality of groove portions formed in a direction perpendicular to the longitudinal direction of the light-guide portion 51 (the traveling direction of the light) and along the face of the light-guide portion 51. Although not shown, the section shape of the groove is triangular and achieves reflection in a predetermined direction (toward the light-transmitting member 52 in the present embodiment).

The plurality of groove portions formed in the direction perpendicular to the traveling direction of the light allows the light entering the light-guide portion 51 to be reflected efficiently in the predetermined direction, that is, toward the light-transmitting member 52 in the present embodiment.

In the light-guide portion 51 and the light-transmitting member 52, the brightness is reduced with distance from the first light source 7. Especially, since the widths of the light-guide portion 51 and the light-transmitting member 52 are increased with distance from the first light source 7, the brightness is further reduced. To address this, the groove portions are formed to have smaller intervals between them with distance from the first light source 7. This suppresses reflection in positions close to the light source with high intensity of light and increases reflection in positions close to the leading end with low intensity of light to enable uniform light emission efficiently.

The light-transmitting member 52 is made of light-transmittable synthetic resin and has a milky color in the present embodiment. The light-transmitting member 52 is provided at the position on the side of the light-guide portion 51 opposite to the side on which the light-reflecting portion 55 is provided, that is, on the upper face (the upper-side face in FIG. 2) of the light-guide portion 51 and in the portion coincident with the light-reflecting portion 55 of the light-guide portion 51.

The light-transmitting member 52 is provided with diffusing portions 56a, 56b which diffuse the light from the light-reflecting portion 55. The diffusing portions 56a, 56b are formed of fine projections and depressions. The diffusing portion 56a is formed on the face of the light-transmitting member 52 opposite to the light-guide portion 51 and a light-exit face 57 of the light-transmitting member 52. The diffusing portions 56a, 56b formed on the opposite face and the light-exit face 57 can achieve a higher diffusing effect to realize uniform illumination.

The shield member 53 is made of light-shielding synthetic resin, has a U shape, and covers the side faces of the light-guide portion 51 and the light-transmitting member 52. The shield member 53 prevents a leak of light from the side faces of the light-guide portion 51 and the light-transmitting member 52 and holds and fixes the light-guide portion 51 and the light-transmitting member 52. The shield member 53 can be used to fix the light-guide portion 51 and the light-transmitting member 52 without using any adhesive or the like. The shield member 53 may cover not only the side faces of the light-guide portion 51 and the light-transmitting member 52 but also the bottom faces thereof.

The first light source 7 is formed of a light-emitting diode and supplies light to the indicating portion 5 to emit light. The first light source 7 is mounted on the flexible substrate 10 and is fixed to the arm portion 3 of the pointer body 6.

Figure 2:
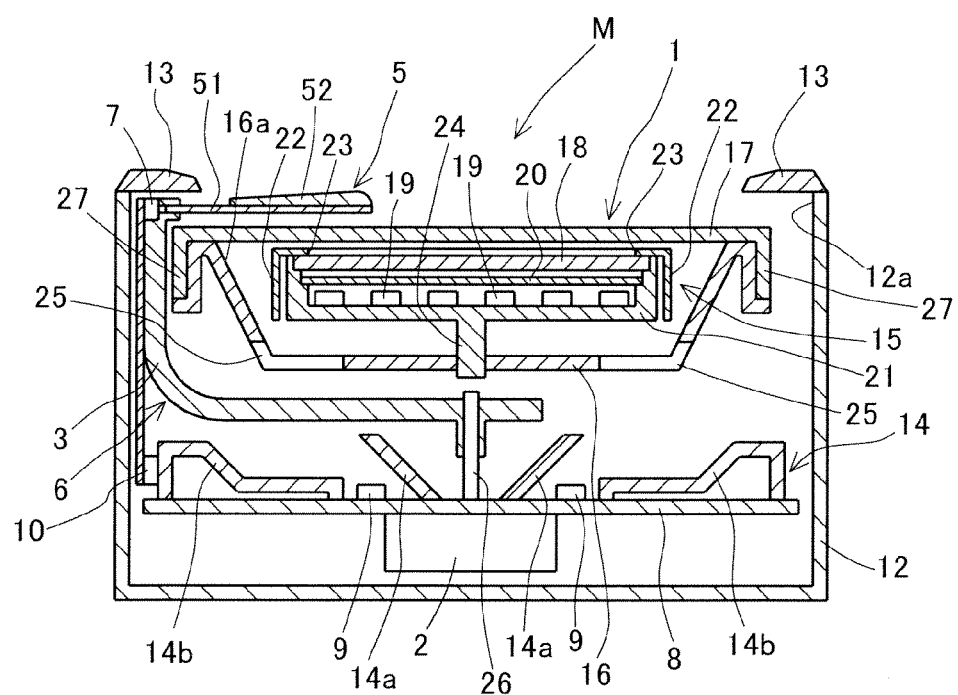
[FIG. 2] A section view taken along a line A-A in FIG. 1.
Figure 3:
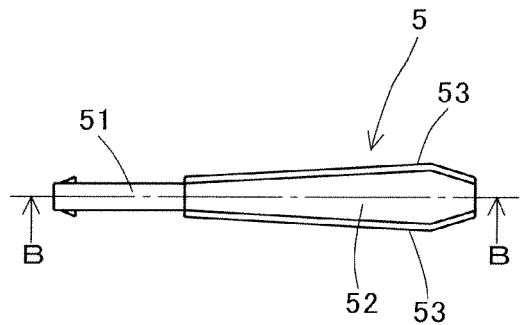
[FIG. 3] A front view showing an indicating portion of Embodiment 1.
Figure 4:
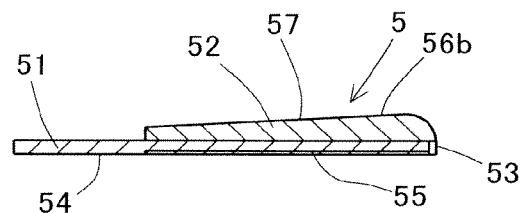
[FIG. 4] A section view taken along a line B-B in FIG. 3.
Figure 5:
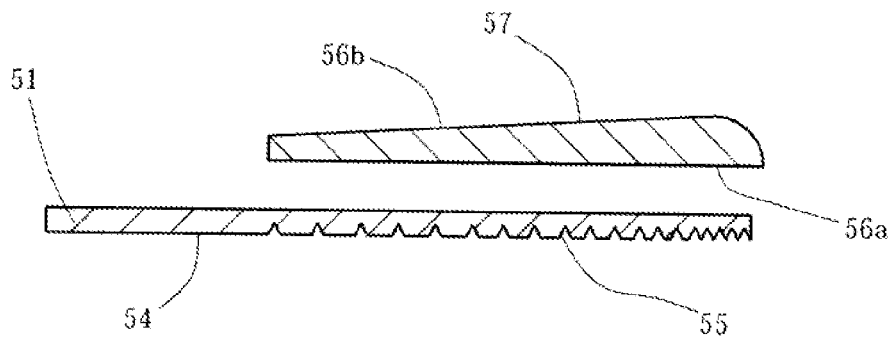
[FIG. 5] An exploded view of a section taken along the line B-B in FIG. 3.

The circuit board 8 is placed on the back-face side of the display means 1 (on the lower side in FIG. 2). The circuit board 8 is a substrate made of hard insulating material such as glass epoxy resin. The display means 1, the drive body 2, the second light source 9, and the frame 14 are fixed to the circuit board 8. A conductor, not shown, is provided on a surface of the first board 8, and electric power is supplied through the conductor to the display 15 of the display means 1, the drive body 2, and the second light source 9.

The second light source 9 is formed of a light-emitting diode and illuminates the surrounding of the display 15 of the display means 1, the interior of the accommodating case 16, and the indicator portion 4.

The flexible substrate 10 is a substrate made of soft insulating material such as polyimide and includes a conductor, not shown. The flexible substrate 10 has one end on which the first light source 7 is mounted and the other end connected electrically to the circuit board 8 through a connector or the like, not shown. A portion of the flexible substrate 10 is placed on the arm portion 3 of the pointer body 6.

The housing 12 is made of light-shielding synthetic resin and accommodates the components of the pointer type measuring instrument M such as the display means 1, the drive body 2, the pointer body 6, and the circuit board 8.

The bend member 13 is made of light-shielding synthetic resin and is provided for an opening 12a of the housing 12. The bend member 13 has a scale 29 constituting the indicator portion formed integrally. The scale 29 represents the vehicle speed together with the indicator portion 4 provided for the front-face cover 17.

The frame 14 is made of white-color synthetic resin and is a reflector which efficiently reflects the light from the second light source 9 to the display means 1. The frame 14 is formed of a first reflector 14a which reflects the light from the second light source 9 to radiate outward around the output shaft 26 and a second reflector 14b which reflects the light reflected by the first reflector 14a toward the display means 1.

With the configuration as above, in the pointer type measuring instrument M in which the indicating portion 5 detours from the outer peripheral side of the display means 1, the mirror-face portion 54 suppressing the reflection of the light from the light-reflecting portion 55 toward the upper-face side and the light-reflecting portion 55 reflecting the light toward the light-transmitting member 52 are provided to allow the indicating portion to be recognized visually as if it floated on the display means 1, thereby providing the pointer type measuring instrument M with a new look. The light-transmitting member 52 including the diffusing portions 56a, 56b is provided to enable the uniform illumination of the indicating portion 5 with suppressed unevenness of light emission in the indicating portion 5.

The light-reflecting portion 55 is formed of the plurality of groove portions formed in the direction perpendicular to the longitudinal direction of the light-guide portion 51 (the traveling direction of the light) and along the face of the light-guide portion 51. Although not shown, the section shape of the groove is triangular and achieves reflection in the predetermined direction (toward the light-transmitting member 52 in the present embodiment). The groove portions are formed to have smaller intervals between them with distance from the first light source 7. This can illuminate the indicating portion 5 with uniform brightness.

While the light-transmitting member 52 is light transmittable and has a milky color in Embodiment 1, the member 52 may be colored according to the color tone of the first light source 7. Such a configuration can clearly represent the color tone of the pointer when no light is emitted and can prevent loss of the color tone of the light source 7 when the first light source 7 is turned on.

An anti-reflection portion for preventing reflection of light may be provided on the side of the light-guide portion 51 opposite to the side on which the mirror-face portion 54 is provided and on the surface coincident with the mirror-face portion 54. Such a configuration can suppress reflection by the mirror-face portion 54 of the light-guide portion 51, so that the mirror-face portion 54 of the light-guide portion 51 forming the indicating portion 5 is not easily recognized visually, and the effect of the indicating portion 5 looking as if it floated can be enhanced.

INDUSTRIAL APPLICABILITY

The invention is applicable to a measuring instrument including a pointer turned in front of a display portion such as a dial and a liquid crystal display.

DESCRIPTION OF REFERENCE NUMERALS AND SIGNS

M pointer type measuring instrument
1 display means (display portion)
2 drive body
3 arm portion
4 indicator portion
5 indicating portion
6 pointer body
7 first light source
26 output shaft
51 light-guide portion
52 light-transmitting member
53 shield member
54 mirror-face portion
55 light-reflecting portion
56a, 56b diffusing portion
57 light-exit face

The invention claimed is:

1. A pointer type measuring instrument comprising:
a display portion,
a drive body provided on a back-face side of the display portion,
an arm portion mounted on an output shaft of the drive body and detouring around an outer periphery of the display portion,
an indicating portion extending from the arm portion toward the center of the display portion and pointing to an indicator portion provided for the display portion, and
a light source mounted on the arm portion or the indicating portion and illuminating the indicating portion, wherein
the indicating portion includes a light-guide portion guiding light emitted by the light source and a light-transmitting member,
the light-guide portion is provided with a mirror-face portion and a light-reflecting portion,
the mirror-face portion is formed adjacent to the light-reflecting portion and on a side of the light source,
the light-reflecting portion is formed on an edge of the indicating portion,
the light-transmitting member is provided on a side of the light-guide portion opposite to a side on which the light-reflecting portion is provided and in a portion coincident with the light-reflecting portion of the light-guide portion, and the light-transmitting member is provided with a diffusing portion which diffuses light from the light-guide portion.

2. The pointer type measuring instrument according to claim 1, wherein the diffusing portion is provided on a face of the light-transmitting member opposite to the light-guide portion and on a light-exit face of the light-transmitting member.

3. The pointer type measuring instrument according to claim 1 or 2, wherein the light-reflecting portion is formed of a plurality of groove portions formed in a direction perpendicular to a longitudinal direction of the light-guide portion.

4. The pointer type measuring instrument according to claim 3, wherein the groove portions are formed to have smaller intervals between them with distance from the light source.

5. The pointer type measuring instrument according to claim 1 or 2, wherein the light-transmitting member is formed in a milky color.

6. The pointer type measuring instrument according to claim 1 or 2, wherein the light-transmitting member is colored according to a color tone of the light source.

7. The pointer type measuring instrument according to claim 1 or 2, wherein a shield member is provided to cover side faces of the light-guide portion and the light-transmitting member.

8. The pointer type measuring instrument according to claim 1 or 2, wherein an anti-reflection portion is provided on a side of the light-guide portion opposite to a side on which the mirror-face portion is provided and on a surface coincident with the mirror-face portion.

* * * * *